(12) United States Patent
Bardi et al.

(10) Patent No.: US 11,702,298 B2
(45) Date of Patent: Jul. 18, 2023

(54) SORTING APPARATUS FOR SORTING AND STACKING TILES

(71) Applicant: SACMI TECH S.P.A., Imola (IT)

(72) Inventors: Maurizio Bardi, Formigine (IT);
Roberto Stefani, Scandiano (IT);
Federico Corazza, Bologna (IT);
Mario Aldo Gianolio Lopez, Corticella (IT); Paolo Uguzzoni, Spezzano di Fiorano (IT)

(73) Assignee: SACMI TECH S.P.A., Imola (IT)

( * ) Notice: Subject to any disclaimer, the term of this patent is extended or adjusted under 35 U.S.C. 154(b) by 29 days.

(21) Appl. No.: 17/610,359

(22) PCT Filed: May 14, 2020

(86) PCT No.: PCT/IB2020/054560
§ 371 (c)(1),
(2) Date: Nov. 10, 2021

(87) PCT Pub. No.: WO2020/230069
PCT Pub. Date: Nov. 19, 2020

(65) Prior Publication Data
US 2022/0242681 A1    Aug. 4, 2022

(30) Foreign Application Priority Data
May 14, 2019   (IT) ....................... 102019000006834

(51) Int. Cl.
*B65G 47/91*   (2006.01)
*B65G 29/00*   (2006.01)
(Continued)

(52) U.S. Cl.
CPC ........... *B65G 47/914* (2013.01); *B65G 29/00* (2013.01); *B65G 47/848* (2013.01);
(Continued)

(58) Field of Classification Search
CPC ...... B65G 29/00; B65G 47/91; B65G 47/915; B65G 49/08; B65G 57/04; B65G 47/848; B65G 47/914; B65G 47/918
(Continued)

(56) References Cited

U.S. PATENT DOCUMENTS

| 1,130,383 A | 3/1915 | Ellison |
| 1,461,222 A | 7/1923 | Miers |

(Continued)

FOREIGN PATENT DOCUMENTS

| DE | 102012223173 A1 | 6/2014 | |
| EP | 3080019 | * 10/2016 | ............ B65G 57/04 |

(Continued)

*Primary Examiner* — James R Bidwell
(74) *Attorney, Agent, or Firm* — R. Neil Sudol; Henry D. Coleman (57) ABSTRACT

An apparatus for sorting and stacking slab-shaped elements has an inlet line; plural suction gripping units; a sorting carousel rotatable around an axis and including multiple carousel arms mutually solidly constrained and each bearing a respective one of the plurality suction gripping units; a plurality of seats for receiving the slab-shaped elements, forming stacks thereof; and a support crown solidly constrained to a frame. The carousel axis and an axis of the support crown coincide with one another. Each carousel arm is supported by the support crown at or in proximity of a respective free end. A first slab-shaped element from the inlet line can be gripped by a first one of the suction gripping units, rotated by a first one of the carousel arms which bears the first suction gripping unit, and released by the first suction gripping unit on a first of the seats.

5 Claims, 9 Drawing Sheets

(51) Int. Cl.
*B65G 57/04* (2006.01)
*B65G 47/84* (2006.01)

(52) U.S. Cl.
CPC ......... *B65G 47/915* (2013.01); *B65G 47/918* (2013.01); *B65G 57/04* (2013.01)

(58) Field of Classification Search
USPC ...................................................... 198/471.1
See application file for complete search history.

(56) References Cited

U.S. PATENT DOCUMENTS

| | | | | |
|---|---|---|---|---|
| 3,712,450 | A * | 1/1973 | Hurst | B21D 51/46 198/608 |
| 5,921,375 | A * | 7/1999 | van Laar | B65G 47/848 198/468.4 |
| 6,185,479 | B1 * | 2/2001 | Cirrone | G06Q 10/08 700/214 |
| 6,334,523 | B1 | 1/2002 | Fukunaga | |
| 2014/0328652 | A1 * | 11/2014 | Cheng | H01L 21/67132 414/223.01 |

FOREIGN PATENT DOCUMENTS

| | | | | |
|---|---|---|---|---|
| EP | 3080019 | A1 | 10/2016 | |
| GB | 895181 | A | 5/1962 | |
| WO | WO 2015081177 | | 6/2015 | |
| WO | 2015/174836 | * | 11/2015 | ............. A24F 47/00 |

* cited by examiner

SORTING APPARATUS FOR SORTING AND STACKING TILES

TECHNICAL SECTOR

The present invention relates to the technical sector concerning the sorting and stacking of tiles.

PRIOR ART

A sorting apparatus is known for sorting and stacking tiles in document EP 3 080 019, comprising:

an inlet line which feeds in tiles to be sorted and arranged in a line;

a sorting carousel which: rotates with respect to a carousel axis; comprises a plurality of suction gripping units; and comprises a plurality of carousel arms which develop radially from the carousel axis, which are solidly constrained to one another, which are equidistanced angularly with respect to one another and which bear the plurality of suction gripping units;

a plurality of seats arranged below the sorting carousel along a portion of a circumference which is coaxial to the carousel axis, which seats are constrained to the frame and are conformed to restingly receive the tiles released by the suction gripping units, forming stacks of tiles.

The sorting apparatus is configured in such a way that a first tile coming from the inlet line can be halted, gripped by a first suction gripping unit of the plurality of suction gripping units, rotated by a first carousel arm of the plurality of carousel arms which bears the first suction gripping unit and released by the first suction gripping unit on a first seat of the plurality of seats.

The sorting carousel has a high moment of inertia, and in order to have a satisfactory productivity it is necessary to impress high accelerations and decelerations, which requires extensive use of electrical power and consumption of electrical energy.

It might therefore be considered to increase the number of rotating arms used, so as to reduce the angular rotation required by the sorting carousel at each pick-up of a tile from the inlet line, but this would lead to an increase in the weight and therefore of the moment of inertia of the sorting carousel itself which would lead to a reduction of the accelerations and decelerations obtainable given a same amount of electricity used, or would lead to an increase in the electrical power used with a further increased in costs.

SUMMARY OF THE INVENTION

The aim of the present invention consists in obviating the above-mentioned drawbacks.

The support crown, which is fixed, guarantees that, at most, only a minor portion of each carousel arm is projecting. This enables using carousel arms that are lighter than those of the prior art: as a consequence, the moment of inertia of the sorting carousel diminishes and this determines a reduction in electrical power consumed and a reduction in consumption of electricity given like performances (accelerations and decelerations) with respect to a sorting apparatus of the prior art, or it is possible to increase productivity (taken to mean the number of slab-shaped elements sorted and stacked per minutes) given a same amount of electrical power used with respect to a sorting apparatus of the prior art (EP 3 080 019).

BRIEF DESCRIPTION OF THE DRAWINGS

Specific embodiments of the invention will be described in the following part of the present description, according to what is set down in the claims and with the aid of the appended tables of drawings, in which:

DESCRIPTION OF PREFERRED EMBODIMENTS

With reference to the appended tables of drawings, reference numeral (1) denotes a sorting apparatus for sorting and stacking slab-shaped elements (2), comprising: a frame (3); an inlet line (4) for infeeding slab-shaped elements (2) to be sorted and stacked; a plurality of suction gripping units for gripping slab-shaped elements (2); a sorting carousel (9) which is rotatable with respect to a carousel axis (A) and which comprises a plurality of carousel arms (6), the carousel arms (6) of the plurality of carousel arms (6) being mutually solidly constrained and each bearing a suction gripping unit (5) of the plurality of suction gripping units (5); a plurality of seats (7) which are configured to receive the slab-shaped elements (2) released by the plurality of suction gripping units (5), forming stacks of slab-shaped elements (2); a support crown (8) which is solidly constrained to the frame (3). The carousel axis (A) and the axis of the support crown (8) coincide with one another. The carousel arms (6) of the plurality of carousel arms (6) and the support crown (8) are dimensioned with respect to one another in such a way that each carousel arm (6) of the plurality of carousel arms (6) is supported by the support crown (8) at or in proximity of the relative free end. The sorting apparatus (1) is configured in such a way that a first slab-shaped element (61) coming from the inlet line (4) can be gripped by a first suction gripping unit (91) of the plurality of suction gripping units (5), rotated by a first carousel arm (71) of the plurality of carousel arms (71) which bears the first suction gripping unit (91) and released by the first suction gripping unit (91) on a first seat (51) of the plurality of seats (7).

The inlet line (4) is preferably suitable for infeeding the slab-shaped elements (2) in a line.

The inlet line (4) is preferably suitable for infeeding the slab-shaped elements (2) in a stepped fashion.

Each suction gripping unit (5) of the plurality of suction gripping units (5) is preferably configured at least to pick up a slab-shaped element from the inlet line (4) (FIG. 4), lift the slab-shaped element (FIG. 7), lower the slab-shaped element (FIGS. 2A, 3) and release the slab-shaped element on a seat (7) of the plurality of seats (7).

Each carousel arm (6) of the plurality of carousel arms (6) is preferably supported by the support crown (8) in such a way that at the most only a portion thereof is projecting. The projecting portion of each carousel arm (6), if present, is preferably smaller than the remaining part of the carousel arm (6) which is not projecting. See for example FIG. 2.

Each carousel arm (6) of the plurality of carousel arms (6) preferably bears a suction gripping unit (5) of the plurality of suction gripping units (5) at the relative free end, so that only that suction gripping unit (5) is cantilevered and projects externally from the support crown (8). By way of example, see again FIGS. 3, 4.

Figure 2:
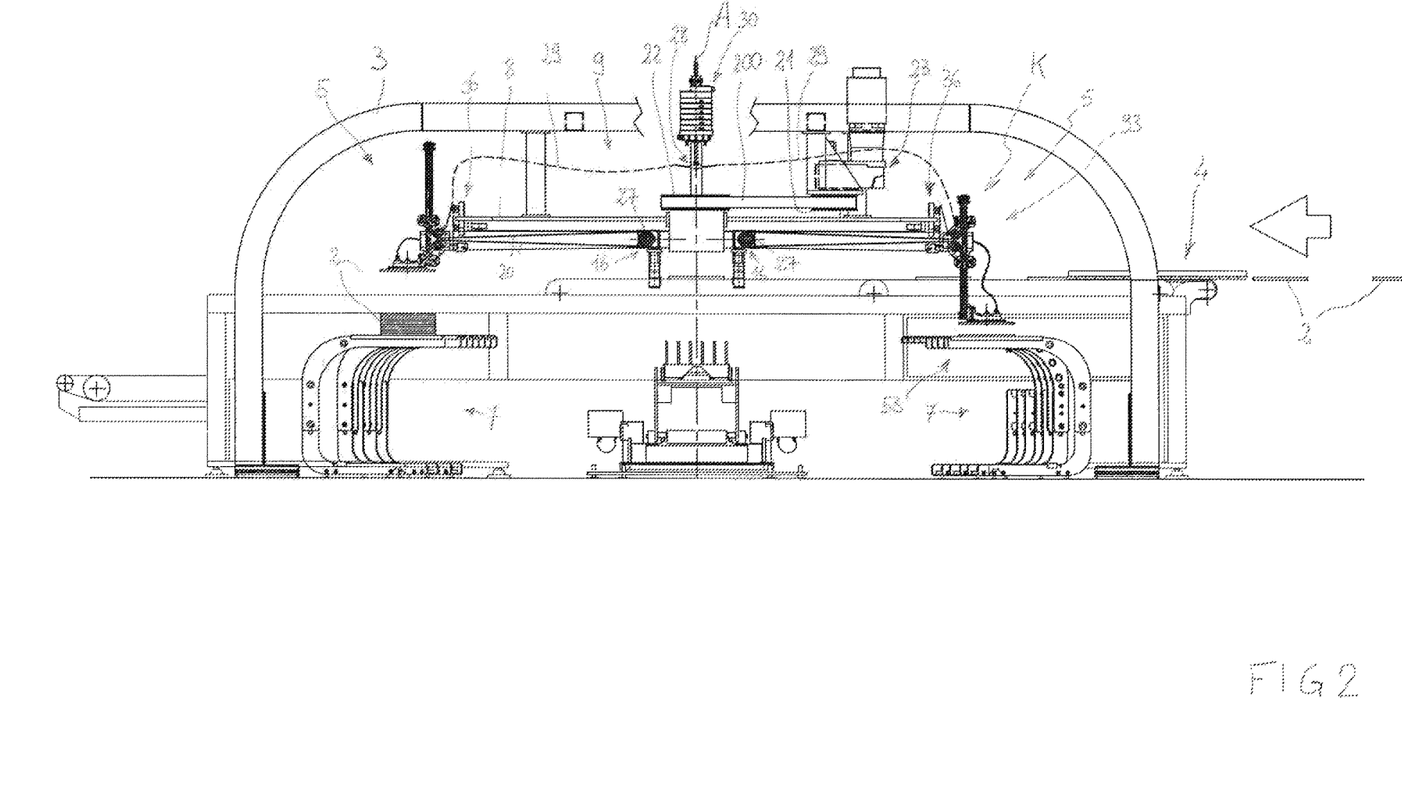
FIGS. 2, 3, 4 are respectively views of sections II-II, III-III, IV-IV of FIG. 1.

The sorting apparatus (1) preferably comprises: a carousel activating motor (23) which is solidly constrained to the frame (3); a first pulley (21) which is drawn by the carousel activating motor (23); a second pulley (22) which is borne by the sorting carousel (9) and which is coaxial with the sorting carousel (9); and a first transmission chain (200) which winds about the first pulley (21) and the second pulley (22), see FIG. 2. The carousel activating motor (23) can thus draw the sorting carousel (9) in rotation. The first pulley (21) and the second pulley (22) are preferably cogged, and the first transmission chain (200) is cogged to enmesh with the cogging of the first pulley (21) and of the second pulley (22).

The plurality of seats (7) are preferably arranged along a circumference that is concentric with the rotation axis of the arms of the plurality of carousel arms (6). See for example FIG. 1, in which it can be seen that the circumference has a larger diameter than the support crown (8).

The seats (7) of the plurality of seats (7) are preferably solidly constrained to the frame (3), being for example fixed to the ground surface.

Figure 5:
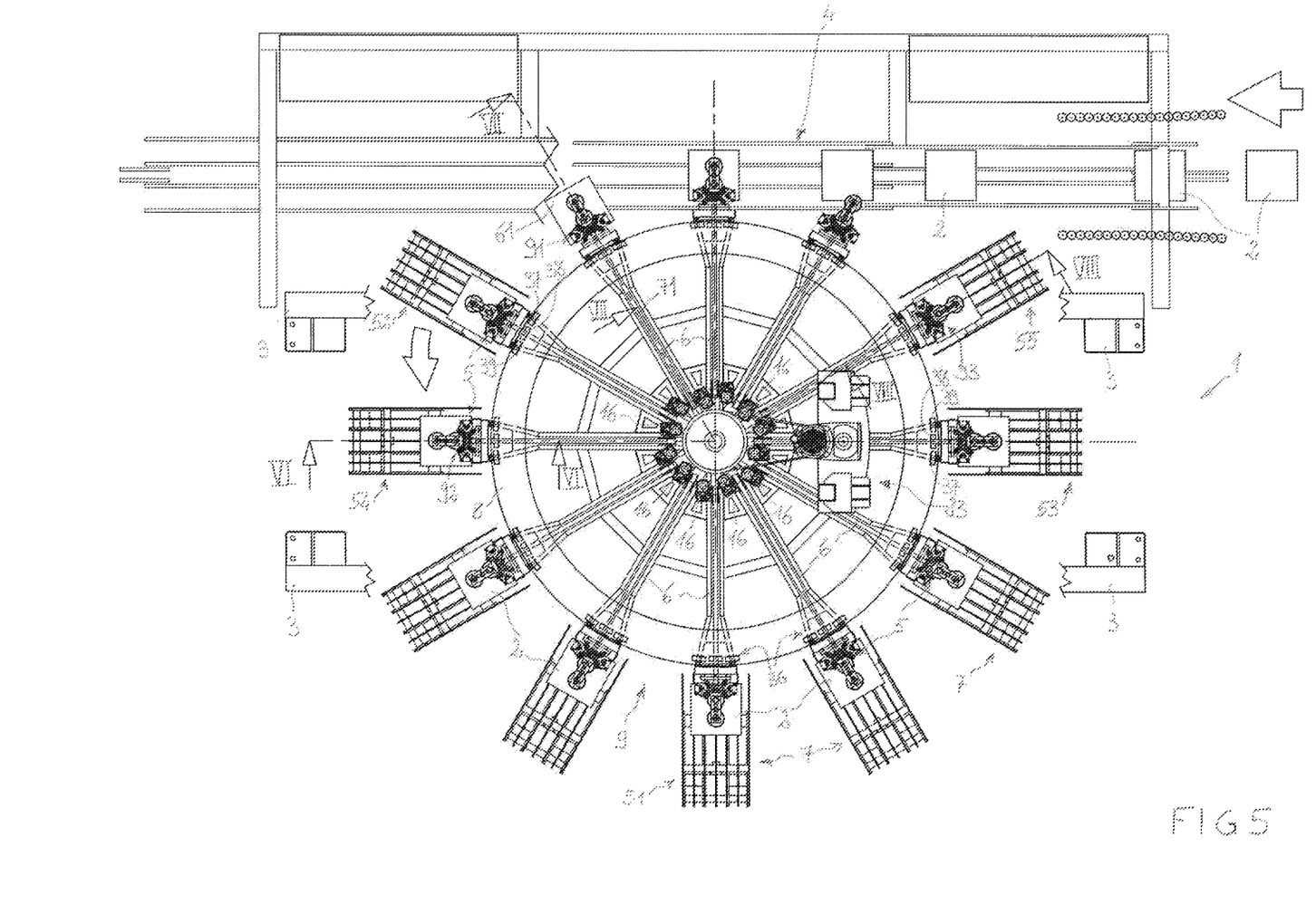
FIG. 5 is the view of the sorting apparatus of FIG. 1, but in a following operating step.

The support crown (8) is preferably circular. See FIGS. 1, 5.

Each suction gripping unit (5) of the plurality of suction gripping units (5) preferably comprises: a depression source (13); at least a first suction cup (14) connected to the depression source (13); a suction cup support (15) which bears the first suction cup (14), which is movable to be raised and lowered so that the first suction cup (14) can pick up a slab-shaped element (2) from the inlet line (4) and can release the slab-shaped element (2) on a seat (7) of the plurality of seats (7); and a raising motor (16) for raising the suction cup support (15).

Each raising motor (16) is preferably arranged in proximity of the rotation axis of the arms (A) in order to limit the relative moment of inertia with respect to the same rotation axis of the arms (A). See FIGS. 1, 5.

Each suction gripping unit (5) of the plurality of suction gripping units (5) can comprise: a carriage (17) that bears the suction cup support (15) at a first end; a guide comprising a pulley support (18) which is solidly constrained to the carousel arm (6) which bears the suction gripping unit (5), and the guide pulleys (19) (for example two four-pulley guide units (19) at different heights with respect to one another) which are rotatably by the pulley support (18) and which are arranged with respect to one another in such a way as to roll against the carriage (17), enabling the carriage (17) to lift (FIGS. 4, 6, 7, 8) and lower (FIGS. 2A, 3); a second transmission chain (20) which at an end thereof is fixed to the first end of the carriage (17) and which at the other side is fixed to a second end, opposite the first end, of the carriage (17); two return pulleys (26) which are rotatably borne by the carousel arm (6) which bears the suction gripping unit (5) and which engage with the second transmission chain (20) in order to return the second transmission chain (20) towards the raising motor (16); and a service pulley (27) which is drawn by the raising motor (16) which engages with the second transmission chain (20), so that the raising motor (16) can raise or lower the carriage (17) and thus the suction cup support (15) and the first suction cup (14). The two return pulleys (26) and the service pulley (27) are preferably cogged and the second transmission chain (20) is cogged. The carriage (17) can be a profiled element.

Figure 4:
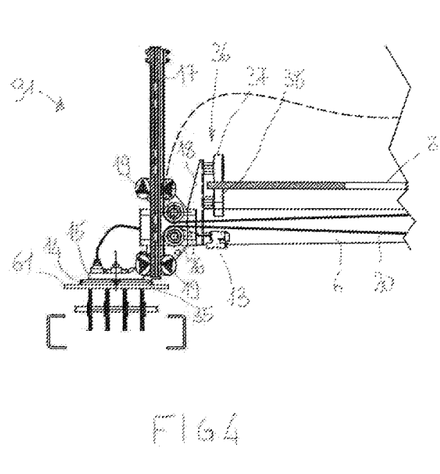

Each suction gripping unit (5) can comprise a second suction cup (35) connected to the depression source (13) and borne by the suction cup support (15), see for example FIG. 4.

The sorting apparatus (1) can comprise a rotary pneumatic joint (28), which powers each suction gripping unit (5) of the plurality of suction gripping units (5). By way of example, FIG. 2 illustrates a tube (29) (in a broken line) which connects the rotary pneumatic joint (28) with the depression source (13) of a suction gripping unit (5); the other connecting tubes that connect the rotary pneumatic joint (28) to the depression sources of the other suction gripping units (5) have not been illustrated for the sake of simplicity.

The sorting apparatus (1) can comprise a rotary electrical joint with sliding contacts (30) in order to supply data signals and electricity on board each carousel arm (6) of the plurality of carousel arms (6).

The sorting apparatus (1) preferably comprises a plurality of wheels (36); each carousel arm (6) of the plurality of carousel arms (6) bears: a first wheel (37) of the plurality of wheels (36) which is arranged at or in proximity of the relative free end in order to abut the support crown (8) and in order to roll on the upper side of the support crown (8); and a second wheel (38) of the plurality of wheels (36) which is arranged at or in proximity of the relative free end in order to abut the support crown (8) and in order to roll on the lower side of the support crown (8), so that the carousel arm (6) is constrained to roll along the support crown (8).

Each carousel arm (6) of the plurality of carousel arms (6) can also bear a third wheel (39) (FIGS. 1, 5) of the plurality of wheels (36) which is in proximity of the first wheel (37), and which is arranged at or in proximity of the relative free end in order to abut the support crown (8) and in order to roll on the upper side of the support crown (8).

Figure 1:
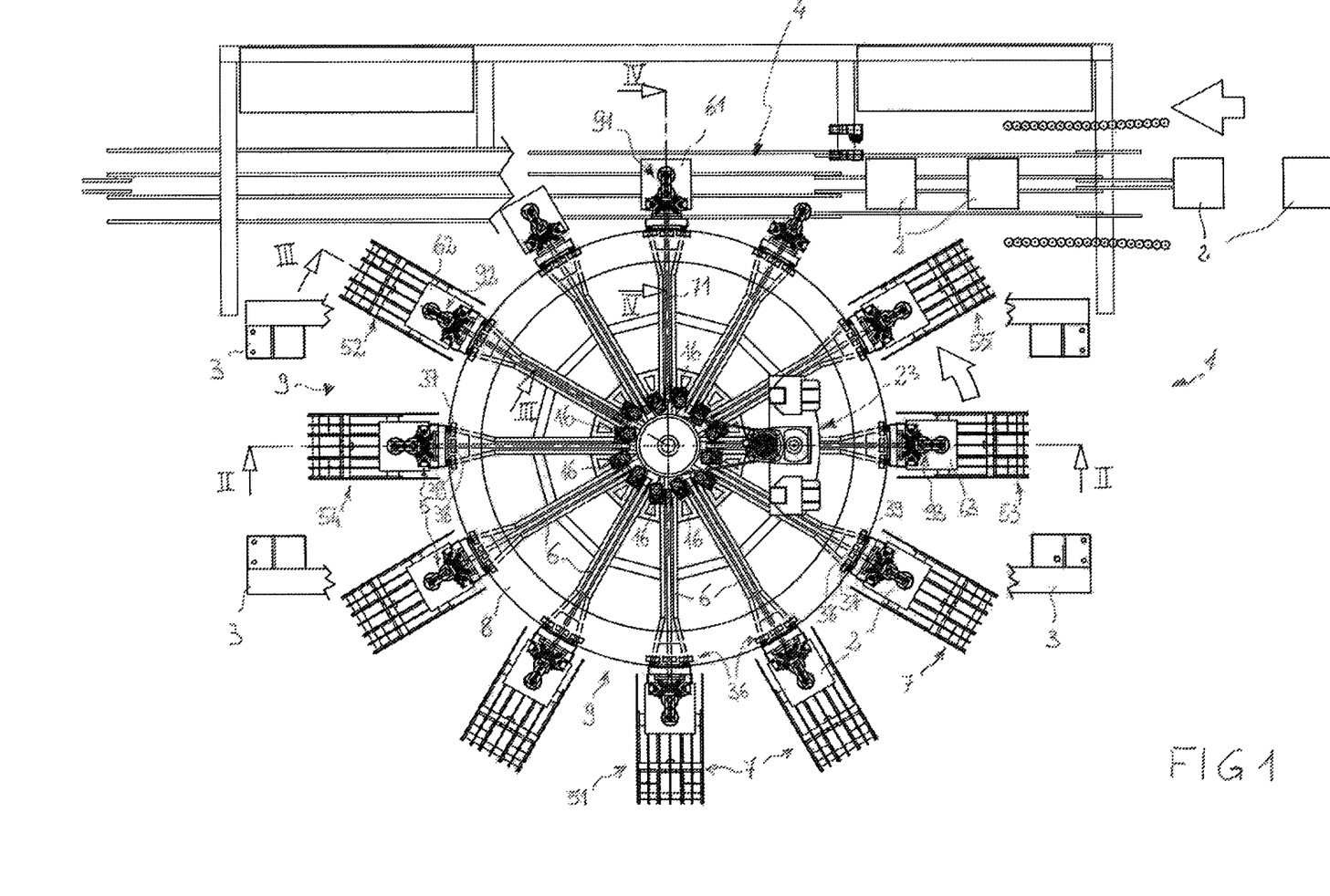
FIG. 1 is a schematic view from above of the sorting apparatus for sorting and stacking slab-shaped elements, object of the present invention.

The seats (7) of the plurality of seats (7) are preferably arranged externally of the support crown (8) and wherein each suction gripping unit (5) of the plurality of suction gripping units (5) is arranged externally of the support crown (8), see for example FIG. 1.

Figure 2A:
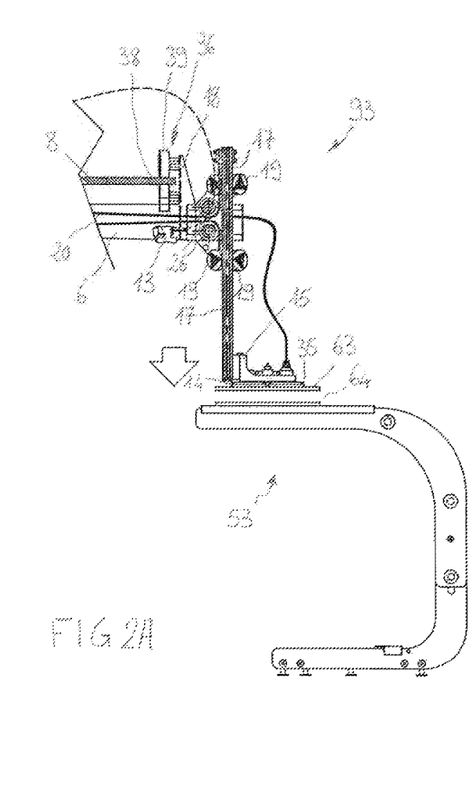
FIG. 2A is a view of larger-scale detail "K2" of FIG. 2.
Figure 3:
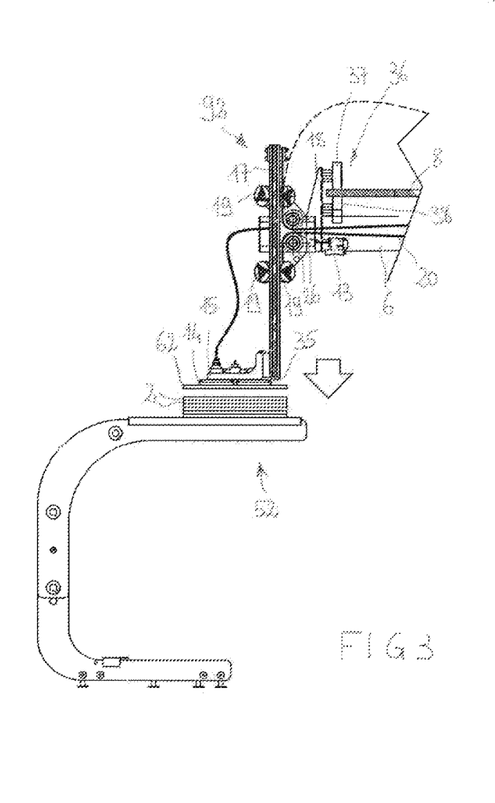

FIGS. 1-4 illustrate a first operating step of the sorting apparatus (1), wherein: the first suction gripping unit (91) is picking up the first slab-shaped element (61) from the inlet line (4), FIG. 4; a second suction gripping unit (92) of the plurality of suction gripping units (5) is releasing a second slab-shaped element (62) on a stack of slab-shaped elements (2) which are arranged on a second seat (52) of the plurality of seats (7), FIG. 3; a third suction gripping unit (93) of the plurality of suction gripping units (5) is releasing a third slab-shaped element (63) on a fourth slab-shaped elements (64) which is arranged on a third seat (53) of the plurality of seats (7), thus forming a stack of two slab-shaped elements (2), FIG. 2A.

Figure 6:
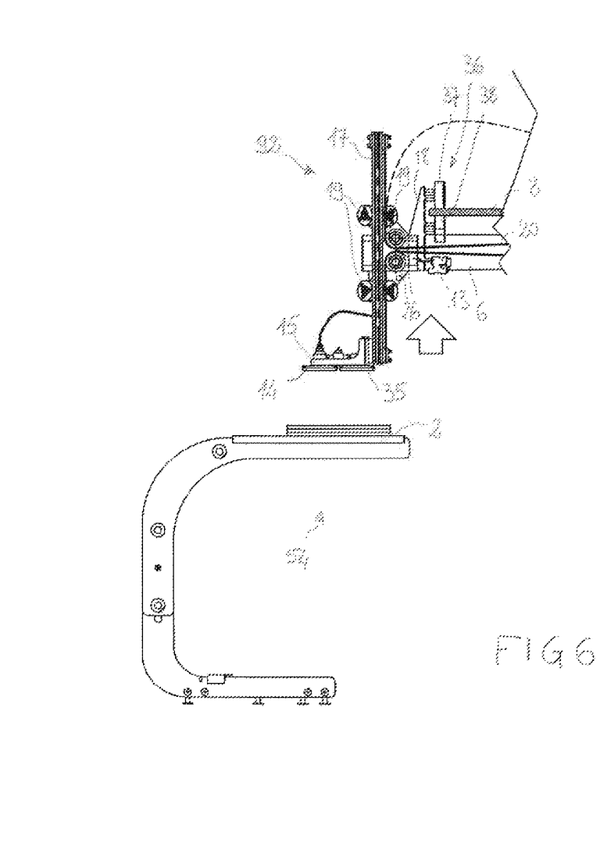
FIGS. 6, 7, 8 are respectively views of sections VI-VI, VII-VII, VIII-VIII of FIG. 5.
Figures 7, 8:
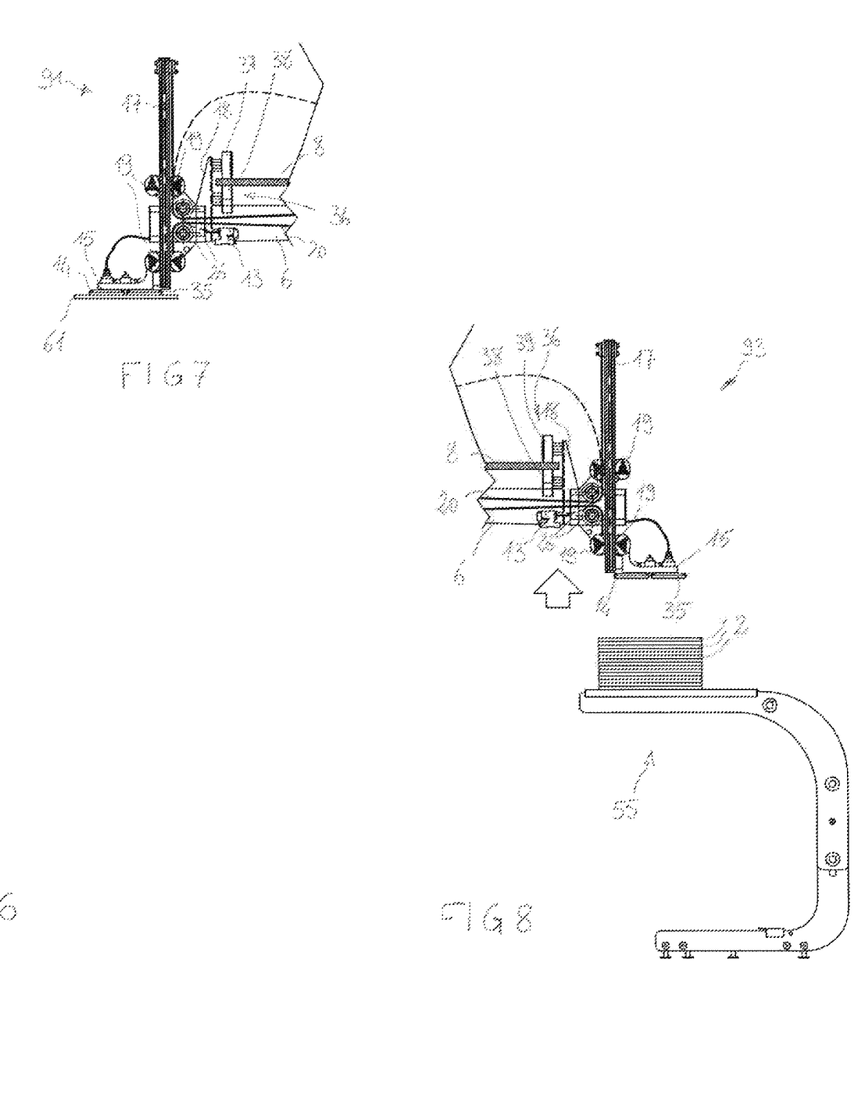

FIGS. 5-8 illustrate a second operating step of the sorting apparatus (1), after the sorting carousel (9) is rotated by an angular step equal to a twelfth of the full circle, wherein: the first suction gripping unit (91) is moving towards the first seat (51) where it will release the first slab-shaped element (61), FIG. 7; the second suction gripping unit (92) has released the second slab-shaped element (62) on the second seat (52) and is in transit above a fourth seat (54) of the plurality of seats (7), FIG. 6; the third suction gripping unit (93) has released the third slab-shaped element (63) on the third seat (53) and is in transit above a fifth seat (55) of the plurality of seats (7), FIG. 8.

In FIGS. from 9 to 15 a possible further variant of the sorting system (1) of the present invention is illustrated, concerning the modalities with which the suction gripping units (5) and the seats (7) for receiving the slab-shaped articles (2) are realised, which enable a significant reduction of the times required for realising stacks of slab-shaped articles in the various seats and thus obtain a significant increase in terms of productivity.

Figure 9:
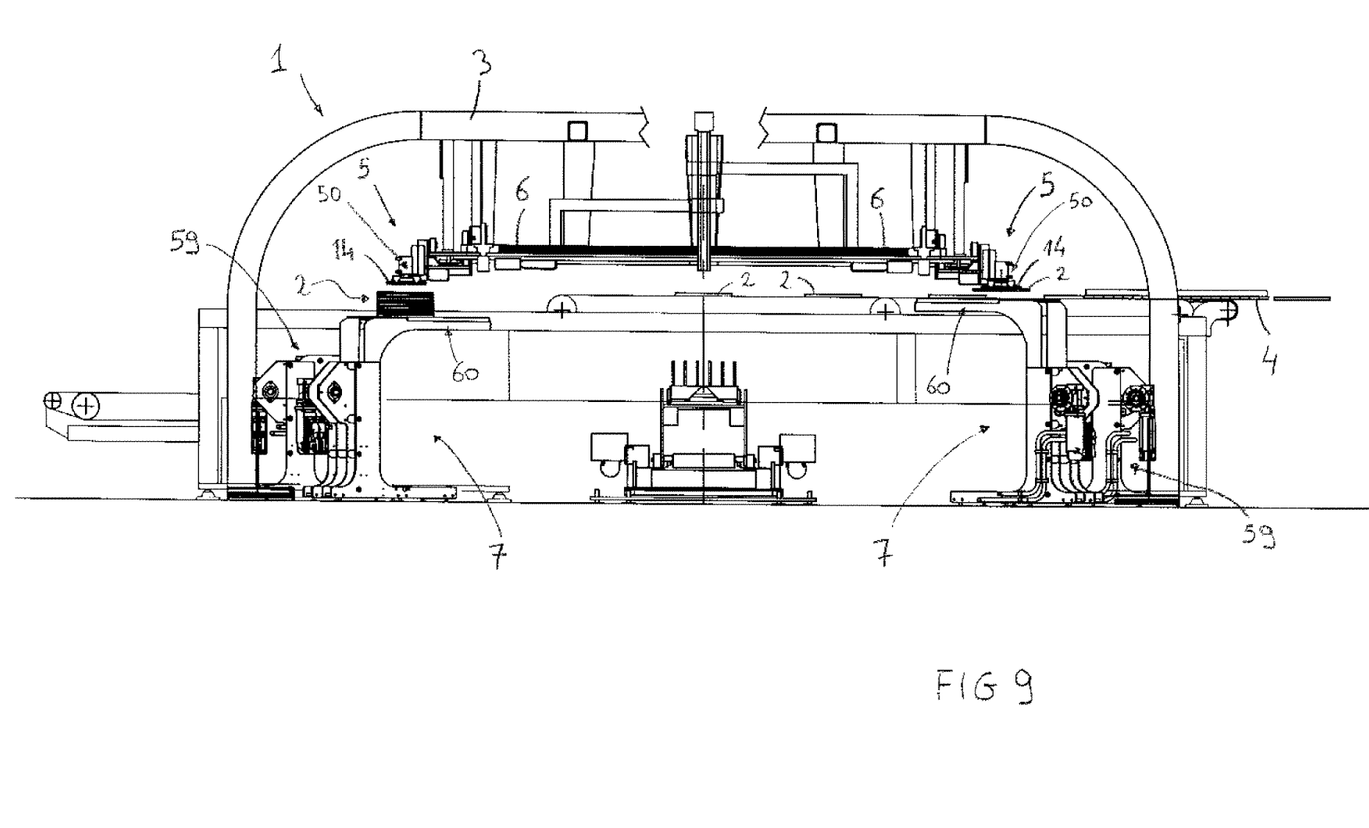
FIG. 9 is a front view of the sorting apparatus of the invention according to a possible variant embodiment concerning the suction gripping units and the seats for receiving the slab-shaped elements.
Figure 10:
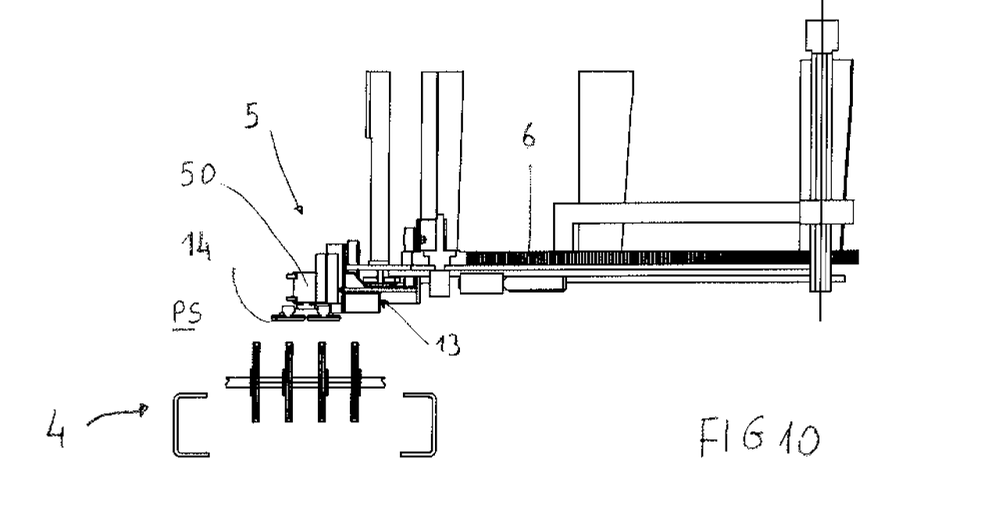
FIGS. 10 and 11 are partial schematic lateral views of a suction gripping unit according to the embodiment of FIG. 9 which is illustrated in two possible configurations.

In this particular and preferred embodiment, each suction gripping unit (5) of the plurality of suction gripping units (5) comprises: a depression source (13), at least a suction cup (14) connected to the depression source (13), and at least a linear actuator organ (50) which is configured to move the suction cup (14) vertically.

Figure 11:
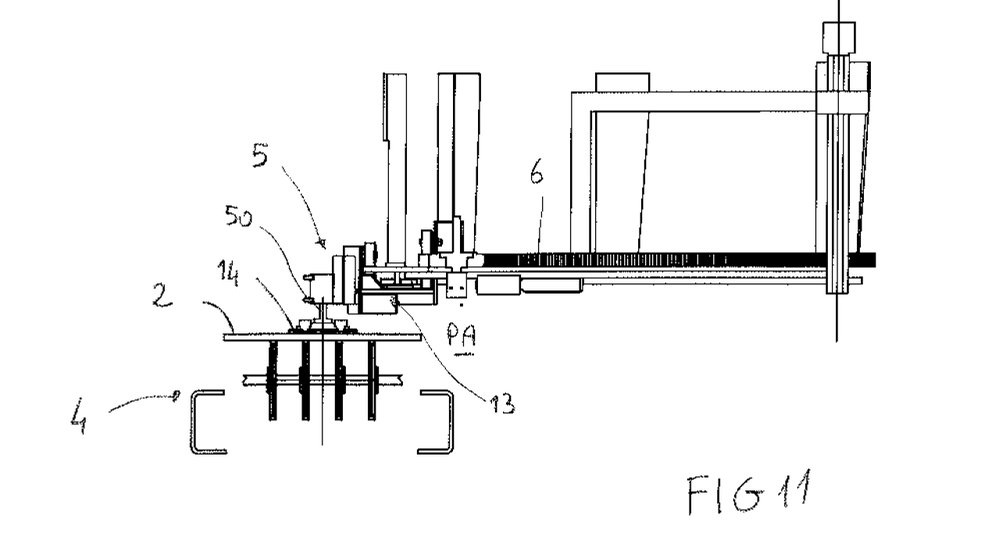

In particular, the linear actuator organ (50) is configured so as to move the suction cup (14) with a stroke of a predetermined entity, between a raised position (PS) (see for example FIG. 10) and a lowered position (PA) (see for example FIG. 11).

For example, the linear actuator organ (50) is preferably constituted by a pneumatic cylinder.

Thus, when each suction gripping unit (5) is positioned by the relative rotating arm (6) above the inlet line (4), the relative suction cup (14) can be moved and positioned by the linear actuator (50), in the lowered position (PA), to pick up by aspiration a slab-shaped article (2) from the inlet line (4) (FIG. 11) and, when moved and positioned by the linear actuator (50) in the raised position (PS), to pick up and retain by aspiration a slab-shaped article (2) from the inlet line (4)

Figure 12:
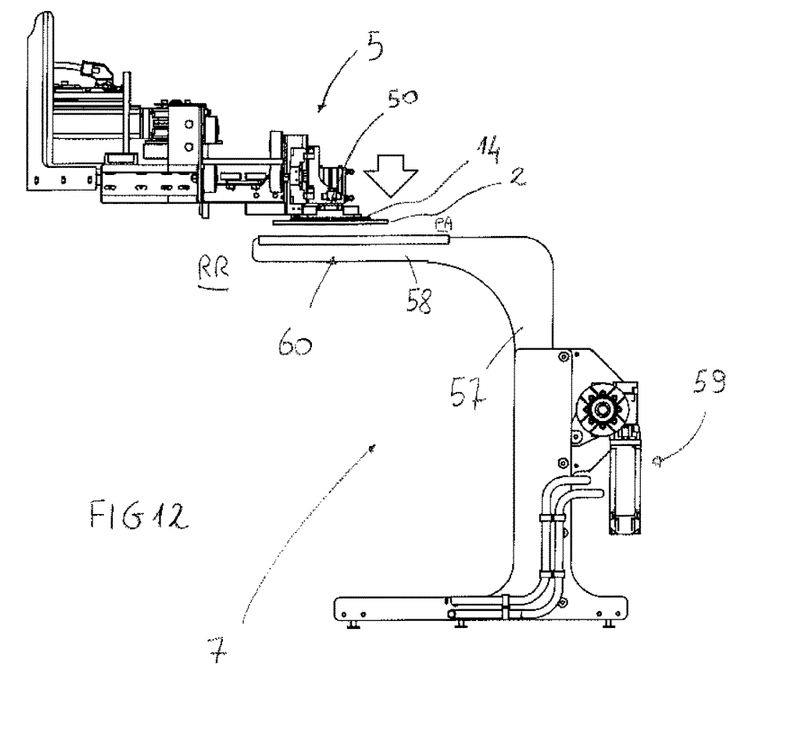
FIGS. 12, 13 and 14 illustrate, in respective schematic lateral views of a possible sequence of release of a slab-shaped article on a seat for receiving the slab-shaped elements and form a stack of slab-shaped articles according to the embodiment of FIG. 9.
Figure 13:
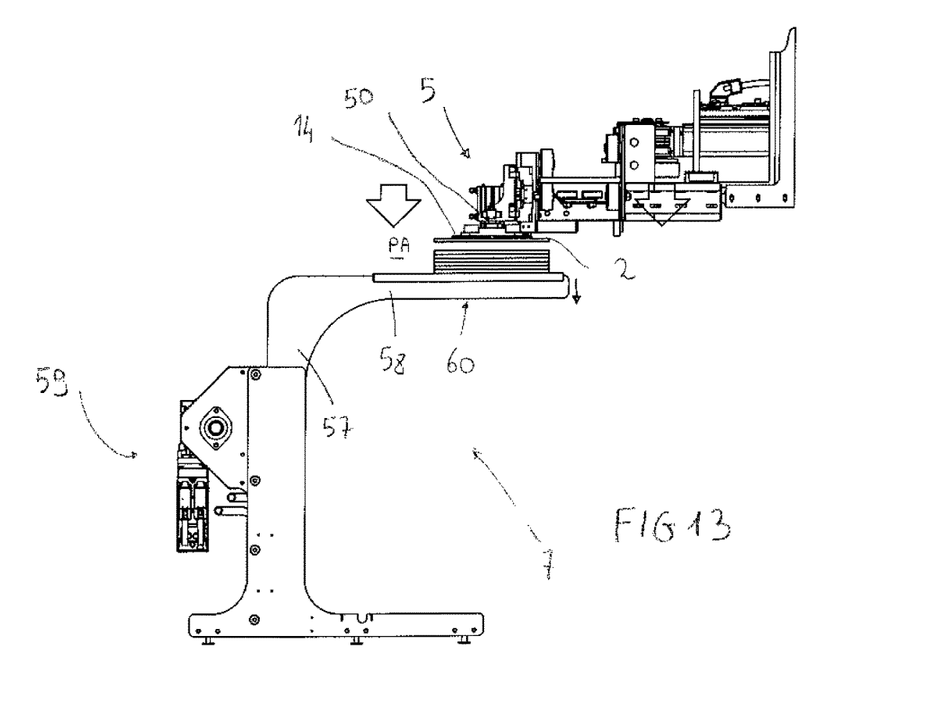

After the suction gripping unit (5) is positioned by the relative rotating arm (6) above a seat (7) of the plurality of seats (7), the suction cup (14) can be moved and positioned by the linear actuator (50) newly in the lowered position (PA), in order to be able to release the slab-shaped article (2) at a seat (7) (see for example FIGS. 12 and 13, which illustrate the movement of the suction cup (14) towards the seat (7) in order to release the slab-shaped article (2)).

Each seat (7) of the plurality of seats (7) is instead configured in such a way as to comprise a rest plane (60) and movement means (59) for vertically moving the rest plane (60).

The rest plane (60) preferably comprises a series of arms (58) parallel to one another and distanced and which are borne by a common support element (57).

Figure 14:
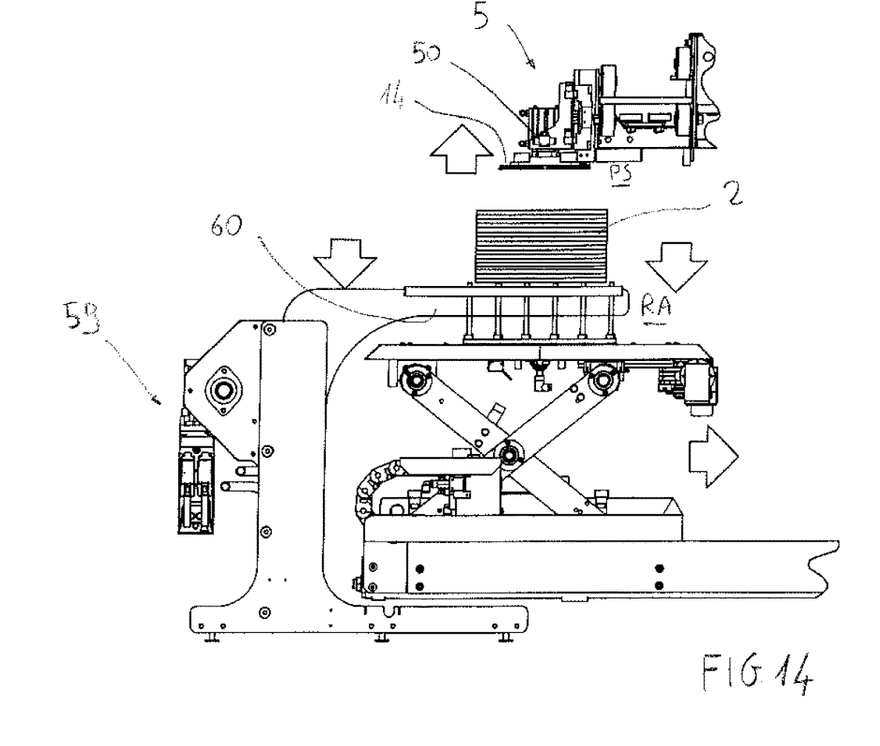

In particular, the movement means (59) are configured so as to vertically move the rest plane (60) in a series of stepped vertical displacements downwards, between an initial raised position (RR) (see for example FIG. 12) and a final lowered position (RA) (see for example FIG. 14).

In particular, the movement means (59) are realised and configured so as to vertically move the rest plane (60) downwards with a series of stepped vertical displacements in which each vertical displacement step is set so as to correspond to the thickness of the slab-shaped articles (2).

In this way, when the rest plane (60) is in the initial raised position (RR) (FIG. 12), a suction cup (14) of a suction gripping unit (5) can release, when moved and positioned in the relative lowered position (PA), a first slab-shaped article (2) onto the rest plane (60).

The seats (7) and the movement means (59) of the rest plane (60) are realised and configured in such a way that the initial raised position (RR) of the rest plane (60) is located at a height from the ground surface that is such as to enable release of the slab-shaped article (2) on the rest plane (60) when the suction cup (14) of the suction gripping unit (5), situated above the rest plane (60), is moved and positioned by the linear actuator organ (50) in the lowered position (PA).

Then, each time the rest plane (60) is moved by a step (corresponding to the thickness of the slab-shaped articles) vertically downwards, and towards the final lowered position (RA), the suction cup (14) of a following suction gripping unit (5) which is formed on the rest plane (60), when moved and positioned by the linear actuator (PA) in the relative lowered position (50), can release a following slab-shaped article (2) directly on the preceding slab-shaped article (2) in such a way as to form a stack of slab-shaped articles (2) on the rest plane (60) (see for example FIG. 13 which illustrates an intermediate step of forming a stack of slab-shaped articles (2), with the rest plane (60) in an intermediate position between the initial raised position (RR) and the final lowered position (RA), or FIG. 14 which instead illustrates the final step of formation of the stack with the rest plane (60) in the final lowered position (RA) and the suction cup (14) of the suction gripping unit (5) which, after having released the final slab-shaped article (2), is newly moved towards the relative raised position (PS)).

Owing to this particularity, the stroke that the suction cup (14) of each suction gripping unit (5) must carry out to release a slab-shaped article (2) at a seat (7) is always the same, set by the stroke of the linear actuator (50) (for example a pneumatic cylinder), while the rest plane (60) of the seats (7), time by time, might be moved in stepped fashion vertically downwards, by a step corresponding to the thickness of the slab-shaped articles (2), in order to move downwards the stack of slab-shaped articles (2) which is under formation and in such a way as to create sufficient space for the release of a following slab-shaped article (2).

The stepped downwards displacement of the rest plane (60) can take place in the waiting time prior to the arrival of a following suction gripping unit (5) above the seat (7).

Definitively, the time necessary to form a complete stack of slab-shaped articles at the various seats is very short, with a consequent improvement in productivity.

Figure 15:
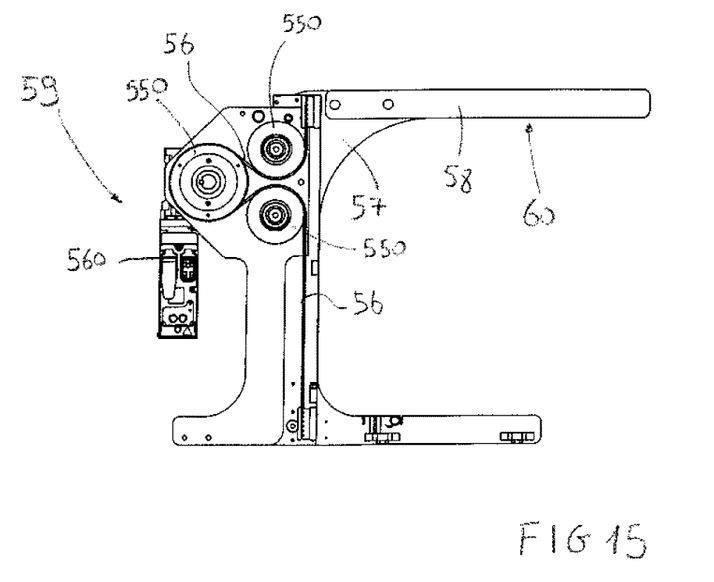
FIG. 15 is a partial schematic lateral view of a seat for receiving the slab-shaped articles and form a stack thereof with some parts that have been removed better to evidence some particular components.

As for example illustrated in FIG. 15, the movement means (59) of the rest plane (60) can preferably comprise an open chain (56) which is fixed, at a first end, at an upper fastening point to the support element (57) of the arms (58) of the rest plane (60), and, at a second end, at a lower fastening point, to the support element (57) of the arms (58) of the rest plane (60), drive transmission organs (550), such as for example pulleys or wheels, on which the chain (56) is wound, and a motor organ (560) (such as for example a brushless motor) for activating in rotation the drive transmission organs (550), in two opposite rotation directions, according to successive predetermined angular rotations.

In this way, for each angular rotation of the drive transmission organs (550) in a first rotation direction, the chain (56) can move the common support element (57) downwards then, and then the arms (58) of the rest plane (60), by a step corresponding to the thickness of the slab-shaped articles.

Once the stack of slab-shaped articles has been formed on the rest plane (60) and extracted from the seat (7), the motor organ (560) can activate the drive transmission organs (550) so that via the chain (56), the rest plane (60) can be returned into the initial raised position (RR) ready to receive other slab-shaped articles.

It is understood that the foregoing has been described by way of non-limiting example, so that any constructional variants are understood to fall within the protective scope of the present technical solution, as claimed in the following.

The invention claimed is:

1. A sorting apparatus for sorting and stacking slab-shaped elements, comprising:
   a frame;
   an inlet line for infeeding slab-shaped elements to be sorted and stacked;
   a plurality of suction gripping units for gripping slab-shaped elements;
   a sorting carousel which is rotatable with respect to a carousel axis and which comprises a plurality of carousel arms, the carousel arms of the plurality of carousel arms being mutually solidly constrained and each bearing a suction gripping unit of the plurality of suction gripping units;
   a plurality of seats which are configured to receive the slab-shaped elements released by the plurality of suction gripping units, forming stacks of slab-shaped elements; and
   a support crown which is solidly constrained to the frame; wherein:
   the carousel axis and the axis of the support crown coincide with one another;
   the carousel arms of the plurality of carousel arms and the support crown are dimensioned with respect to one another in such a way that each carousel arm of the plurality of carousel arms is supported by the support crown at or in proximity of the relative free end; and
   the sorting apparatus is configured in such a way that a first slab-shaped element coming from the inlet line can be gripped by a first suction gripping unit of the plurality of suction gripping units, rotated by a first carousel arm of the plurality of carousel arms which bears the first suction gripping unit and released by the first suction gripping unit on a first seat of the plurality of seats.

2. The sorting apparatus of claim 1, further comprising a plurality of wheels, wherein:
   each carousel arm of the plurality of carousel arms bears a first wheel of the plurality of wheels which is arranged at or in proximity of the relative free end in order to abut the support crown and in order to roll on the upper side of the support crown; and a second wheel of the plurality of wheels which is arranged at or in proximity of the relative free end in order to abut the support crown and in order to roll on the lower side of the support crown, so that the carousel arm is constrained to slide roll along the support crown.

3. The sorting apparatus of claim 1, wherein the seats of the plurality of seats are arranged externally of the support crown and wherein each suction gripping unit of the plurality of suction gripping units is arranged externally of the support crown.

4. The sorting apparatus of claim 1, wherein each suction gripping unit of the plurality of suction gripping units comprises:
   a depression source;
   at least a first suction cup connected to the depression source; and
   a suction cup support which bears the first suction cup, which is movable to be raised and lowered so that the first suction cup can pick up a slab-shaped element from the inlet line and can release the slab-shaped element on a seat of the plurality of seats; and a raising motor for raising the suction cup support.

5. The sorting apparatus of claim 1, wherein each suction gripping unit of the plurality of suction gripping units comprises: a depression source, at least a suction cup connected to the depression source, and at least a linear actuator organ which is configured to move the suction cup with a stroke having a prefixed entity, between a raised position and a lowered position so that the suction cup, when positioned in the lowered position, can pick up by aspiration a slab-shaped article from the inlet line and, when positioned in the raised position, can pick up and retain by aspiration a slab-shaped article from the inlet line, and then, when newly positioned in the lowered position, can release the slab-shaped article at a seat of the plurality of seats, and wherein each seat of the plurality of seats is configured in such a way as to comprise a rest plane and movement means which are configured so as to vertically move the rest plane in a series of stepped vertical displacements downwards between an initial raised position and a final lowered position so that, when the rest plane is in the initial raised position, the suction cup of a suction gripping unit can release a slab-shaped article onto the rest plane, when it is moved and positioned in the relative lowered position, and then, each time the rest plane is moved by a step vertically downwards, and towards the final lowered position, a suction cup of a following suction gripping unit, when positioned in the relative lowered position, it can release a following slab-shaped article on the preceding slab-shaped article in such a way as to form a stack of slab-shaped articles on the rest plane.

* * * * *